United States Patent [19]

Morita et al.

[11] 4,311,817

[45] Jan. 19, 1982

[54] PROCESS FOR POLYMERIZING OLEFINS AND CATALYST THEREFOR

[75] Inventors: Yoshinori Morita; Norio Kashiwa, both of Iwakuni, Japan

[73] Assignee: Mitsui Petrochemical Industries Ltd., Tokyo, Japan

[21] Appl. No.: 183,580

[22] Filed: Sep. 2, 1980

Related U.S. Application Data

[63] Continuation of Ser. No. 939,865, Sep. 5, 1978, abandoned.

[30] Foreign Application Priority Data

Sep. 9, 1977 [JP] Japan ............................. 52/107704

[51] Int. Cl.$^3$ ................................................ C08F 4/16
[52] U.S. Cl. ................................................. 526/124
[58] Field of Search ........................................ 526/124

[56] References Cited

U.S. PATENT DOCUMENTS

| | | | |
|---|---|---|---|
| 3,644,318 | 2/1972 | Diedrich et al. | 526/124 |
| 3,759,884 | 9/1973 | Tokuzumi et al. | 526/124 |
| 3,772,261 | 11/1973 | Faltings et al. | 526/116 |
| 3,839,313 | 10/1974 | Galli | 526/124 |
| 3,892,717 | 7/1975 | Mori et al. | 526/124 |
| 3,953,414 | 4/1976 | Galli | 526/125 |
| 4,098,979 | 7/1978 | Maemoto et al. | 526/141 |

FOREIGN PATENT DOCUMENTS 1436426 5/1976 United Kingdom.

*Primary Examiner*—Paul R. Michl
*Attorney, Agent, or Firm*—Sherman & Shalloway

[57] ABSTRACT

A process for polymerizing or copolymerizing an α-olefin in the presence of a catalyst composed of (A)' a transition metal catalyst component resulting from supporting a halogen-containing transition metal compound on spray-dried solid spherical particles of a magnesium compound and (B)' an organometallic compound of a metal of Groups I to III of the periodic table, wherein the transition metal catalyst component (A)' is a catalyst component (A) prepared by supporting the halogen-containing transition metal compound on solid spherical particles having a specific surface area of at least 20 m$^2$/g and an average particle diameter of 5 to 300μ obtained by spray-drying a suspension of an oxygen-containing, halogen-free magnesium compound having an average particle diameter of 0.01 to 20μ, and a catalyst composition for use therein.

10 Claims, No Drawings

PROCESS FOR POLYMERIZING OLEFINS AND CATALYST THEREFOR

This is a continuation of application Ser. No. 939,865, filed Sept. 5, 1978, now abandoned.

This invention relates to a process for polymerizing or copolymerizing olefins which can afford in increased yields per unit amount of catalyst olefin polymers or copolymers in the shape of spherical particles having a relatively large particle diameter, a narrow particle size distribution and a high bulk density with markedly reduced formation of fine powdery polymers or copolymers; and to a catalyst composition for use in the performance of this process.

More specifically, the invention relates to a process for polymerizing or copolymerizing α-olefins in the presence of a catalyst composed of (A)' a transition metal catalyst component resulting from supporting a halogen-containing transition metal compound on spray-dried solid spherical particles of a magnesium compound and (B)' an organometallic compound of a metal of Groups I to III of the periodic table, wherein the transition metal catalyst component (A)' is a catalyst component (A) prepared by supporting the halogen-containing transition metal compound on solid spherical particles having a specific surface area of at least 20 m²/g and an average particle diameter of 5 to 300μ obtained by spray-drying a suspension of an oxygen-containing, halogen-free magnesium compound such as magnesium hydroxide or magnesium oxide having an average particle diameter of 0.01 to 20μ; and to a catalyst composition therefor.

Many suggestions have been known heretofore to polymerize or copolymerize olefins in the presence of a catalyst composed of a transition metal catalyst component prepared by supporting a transition metal compound on solid particles of a magnesium compound and an organometallic compound of a metal of Groups I to III of the periodic table. Methods of this type in which an oxygen-containing, halogen-free magnesium compounds such as magnesium hydroxide or magnesium oxide is used as a carrier are also known (see, for example, British Pat. Nos. 1,257,040 and 1,140,649, and U.S. Pat. No. 3,759,884).

The use of a transition metal catalyst component comprising a transition metal compound supported on such an oxygen-containing halogen-free magnesium compound is not entirely satisfactory in regard to the yield of polymer per unit weight of catalyst, and it is difficult to omit an operation of removing the catalyst from the resulting polymer. If this operation is omitted, the amount of ash ascribable to the carrier in the polymer becomes significant and this causes troubles in fabrication, for example the occurrence of fish eyes in films or the breakage of filaments. The polymers obtained by such methods have a relatively low bulk density and are generally irregularly-shaped (i.e., not spherical or elliptical) fine powders not having a narrow particle size distribution. Direct fabrication of such polymers causes troubles such as the occurrence of dust or the reduced efficiency of fabrication. In actual operations, therefore, it is the practice to pelletize the polymer into molding pellets so as to increase its bulk density and the efficiency of fabrication.

A catalyst for olefin polymerization obtained by reacting an organometallic compound of a metal of Groups I to III of the periodic table with a spherical particulate transition metal catalyst component having a diameter of 1 to 350μ and composed of a halogen-containing titanium compound supported on an anhydrous magnesium halide carrier having a specified disintegration resistance, a specified average pore radius and a certain specific surface area was suggested for the purpose of giving with a high activity an olefin polymer or copolymer which has resistance to disintegration or coagulation, is in the form of spherical to elliptic particles, and permits the omission of a catalyst removing operation or a pelletizing operation (Japanese Laid-Open Patent Publication No. 65999/74; West German Laid-Open Patent Publication No. 2,305,707).

According to this suggestion, the spherical particulate transition metal catalyst component is prepared by using a magnesium halide carrier formed by a spray-drying means. Specifically, it is prepared by spray-drying a hydrated magnesium halide which is molten or if possible, dissolved in water, especially molten $MgCl_2.6H_2O$, by known techniques and devices to form a spherical particulate magnesium halide, partially dehydrating the magnesium halide with care taken not to cause its hydrolysis, and then reacting the resulting magnesium halide particles with a halogen-containing titanium compound. Alternatively, an organic solvent having a boiling point of 60° to 150° C. such as an alcohol, ether, ketone or ester is used instead of water, and a solution of an anhydrous magnesium halide in the solvent is spray-dried and the solvent is removed by heating under reduced pressure to form a spherical particulate carrier which is used to form the spherical particulate transition metal catalyst component. The use of such a catalyst component makes it possible to form a spherical particulate olefin polymer or copolymer having improved resistance to disintegration. But the results are still not entirely satisfactory, and troubles still occur.

When a catalyst prepared by using as a carrier particles of a magnesium halide obtained by spray-drying a molten hygrated magnesium halide or a solution of it in a solvent is used in polymerizing an α-olefin with stirring under batchwise polymerization conditions, the resulting polymer cannot maintain a satisfactory form and a satisfactory particle diameter distribution.

When the polymerization is carried out by a continuous slurry polymerization method which is a general commercial operation, the polymer disintegrates not only in the polymerization reactor, but also in pumps and lines during transit within the polymerization system. The disintegration of the polymer also occurs easily at the time of separating it from the polymerization solvent in a decanter. Furthermore, the catalyst itself tends to disintegrate during transit within the polymerization process, and therefore, it is difficult to obtain satisfactory results in the shape and the size distribution of the resulting polymer.

It has also been found that when a molten mass or a solvent solution of a hydrated magnesium halide is spray-dried, it causes corrosion of the spray-drying device.

The present inventors made extensive investigations in order to overcome the many technical problems associated with the prior art techniques described above. These investigations have led to the discovery that a spherical (the term meant to include "elliptical") olefin polymer or copolymer having a relatively large particle diameter, a narrow particle size distribution and a high bulk density can be prepared in an increased yield per unit weight of catalyst by using a catalyst component (A) composed of a halogen-containing transition metal compound supported on solid spherical particles of magnesium compound having a specific surface area of at least 20 m$^2$/g and an average particle size of 5 to 300$\mu$ which are formed by spray-drying a suspension of an oxygen-containing and halogen-free magnesium compound such as magnesium hydroxide or magnesium oxide having an average particle diameter of 0.01 to 20$\mu$.

It has also been found that because the catalyst has a very high activity, it is not necessary to remove the catalyst residue from the resulting polymer, and also because the resulting polymer has a very high bulk density or a very narrow particle size distribution, the polymerization operation is rendered very advantageous, and that the step of pelletizing the polymer which is customary in the production of olefin polymers can be omitted, and thus, the traditional process can be simplified.

Another discovery is that the resulting catalyst and polymer particles are less prone to disintegrate than in the case of using a spherical magnesium halide carrier obtained by spray-drying a molten mass or solvent solution of a hydrated magnesium halide; that the shape of the polymer is good and its particle size distribution can be further narrowed; and that the trouble of corroding metallic materials described hereinabove can be also removed.

It is an object of this invention therefore to provide a process for polymerizing or copolymerizing olefins which can achieve the aforesaid improvements.

The above and other objects and advantages of the invention will become more apparent from the following description.

The oxygen-containing, halogen-free magnesium compound used in the formation of the transition metal catalyst component (A) used in this invention is, for example, halogen-free compound containing a magnesium atom and an oxygen atom as main constituent elements, such as magnesium oxide, magnesium peroxide and magnesium hydroxide. Compounds containing small amounts of carbonic acid radical, sulfuric acid radical, nitric acid radical, phosphoric acid radical, or organic acid radical can also be used. Oxygen-containing, halogen-free complex compounds of aluminum and magnesium, such as the one known as hydrotalcite, can also be used. There can also be used complex compounds of magnesium and at least two metals selected from the group consisting of calcium, barium, boron, aluminum, silicon, germanium, tin, bismuth, selenium, chromium, manganese, iron, cobalt, nickel, copper, zinc, zirconium, molybdenum, sodium, lithium, potassium and strontium. Hydroxides, oxides, or salts (e.g., hydroxycarbonates, hydroxyphosphates) of these metals can be used. Oxygen-containing, halogen-free compounds of magnesium having an organic group, such as alkoxy magnesiums (e.g., magnesium methylate, magnesium ethylate or magnesium isopropylate), and magnesium phenolate, can also be used.

Among these oxygen-containing, halogen-free compounds of magnesium, the oxides and hydroxides of magnesium, such as magnesium oxide, magnesium hydroxide or magnesium peroxide, are especially preferred.

The starting magnesium compound used to prepare the spherical particles of the magnesium compound as a carrier has an average particle diameter of 0.01 to 20$\mu$, preferably 0.01 to 5$\mu$. When commercially available magnesium compounds having a relatively large average particle diameter are used, they should be pulverized, sieved or otherwise treated prior to use to attain average particle diameters within the specified range.

When magnesium hydroxide, for example, is used as the oxygen-containing, halogen-free compound, it may be prepared as a sol-like or gel-like compound having a particle diameter of 0.01 to 20$\mu$ by reacting (e.g., hydrolyzing) a magnesium compound soluble in water or organic solvents. Examples of such an oxygen-containing, halogen-free compound are the hydrolysis products of magnesium sulfate and magnesium alcoholates.

The pulverizing operation may be performed by generally known techniques. The following methods can, for example, be used to obtain an oxygen-containing, halogen-free compound of magnesium having a particle diameter of 0.01 to 20$\mu$.

One of them is a wet pulverizing method which performs pulverization in the presence of water or an organic liquid medium such as hydrocarbons (e.g., hexane, heptane) and alcohols (e.g., methanol, ethanol) by using a homomixer which is used ordinarily in dynamic pulverization and has a strong shearing force and a strong pulverizing impact force under high-speed stirring. The conditions for pulverizing the oxygen-containing, halogen-free magnesium compound to a particle diameter of 0.01 to 20$\mu$, preferably 0.01 to 5$\mu$, by the wet pulverization in a homomixer differ according to the rotating speed, shearing force, and pulverizing impact force of the homomixer. Usually, the magnesium compound can be pulverized to the desired particle diameter by pulverizing a suspension of the magnesium compound in a concentration of 5 to 60% by weight with stirring at a speed of at least 500 rpm, preferably at least 1000 rpm, for at least 5 minutes. Other methods which can be used include the one which performs wet pulverization in the presence of water or an organic liquid medium using ultrasonic vibration, and the one in which the magnesium compound is pulverized preferably in the wet state to a particle size of 0.01 to 20$\mu$ by using a mixing-pulverizing machine such as a rotary ball mill or vibratory mill.

The oxygen-containing, halogen-free compound which has been pulverized as described above to a particle diameter in the range of 0.01 to 20$\mu$ is then suspended in water or an organic liquid medium, and spray-dried into hot air. Thus, spherical particles of the magnesium compound having a particle diameter of 5 to 300$\mu$, preferably 10 to 200$\mu$, can be prepared.

Specifically, the spherical solid particles of the magnesium compound can be formed by spraying a suspension of the magnesium compound in water or an organic liquid medium in a solids concentration of preferably 1 to 60% by weight, more preferably 5 to 40% by weight, into hot air by using known techniques and devices. In spraying, a nozzle having orifices which will bring the particle diameter of the resulting spherical particles of the magnesium compound to 5 to 300$\mu$, preferably 10 to 200$\mu$, is used, or the speed of rotation is selected by using a disc rotating at high speed, and the suspension is sprayed into a hot gas such as air or nitrogen. By spraying the suspension into the hot gas in this manner, the temperature and pressure of the hot gas, the temperature of the suspension, and the speed of feeding the suspension can be selected so that the amount of the solvent remaining in the magnesium compound is less than 10% by weight, preferably less than 5% by weight.

The liquid medium used at the time of spray drying is water or an organic liquid medium. The organic liquid medium may have a polar group, and examples of the organic liquid medium include aliphatic hydrocarbons such as hexane, heptane or kerosene, aromatic hydrocarbons such as benzene or toluene, alcohols such as methanol, ethanol or propanol, ketones such as acetone, and ethers such as diethyl ether, dipropyl ether, dibutyl ether and tetrahydrofuran. The hydrocarbon are mainly used. Generally, it is desirable to select media having a relatively low boiling point in order to perform drying rapidly or to reduce the amount of the liquid medium remaining in the oxygen-containing, halogen-free magnesium compound.

The specific surface area of the oxygen-containing, halogen-free magnesium compound obtained in the manner described hereinabove is generally higher than that of the starting material by at least 1.1 times, and in many cases by at least 1.5 times. A starting magnesium compound having a lower specific surface area tends to give a product having a higher specific surface area.

If required, the resulting oxygen-containing, halogen-free magnesium compound is subjected to aftertreatments such as screening, drying at atmospheric or reduced pressure, and then can be used to prepare the transition metal catalyst component (A).

The transition metal catalyst component (A) is prepared by supporting a halogen-containing transition metal compound on the resulting spherical particles of oxygen-containing, halogen-free magnesium compound having a specific surface area of at least 20 m$^2$/g, for example 20 to 500 m$^2$/g, and an average particle diameter of 5 to 300μ. This can be achieved by various methods, for example (i) a method which comprises directly reacting the halogen-containing transition metal compound with the oxygen-containing, halogen-free magnesium compound; (ii) a method which comprises pretreating the oxygen-containing, halogen-free magnesium compound with an electron donor, a halogenating agent or an organometallic compound, and then reacting the resulting product with a transition metal compound; (iii) a method which involves reacting an electron donor or halogenating agent during the reaction of the transition metal compound in the two methods (i) and (ii) described above; (iv) a method which comprises reacting the transition metal compound by any of the three methods (i) to (iii) described above, and then reacting at least one of an electron donor, a halogenating agent or an organo-metallic compound in any optional order with the reaction product, and if desired, causing the transition metal compound to act at any desired stage.

Below are listed preferred compounds used in the embodiments of reacting the electron donor, halogenating agent or organometallic compounds in the above-cited methods.

Examples of the electron donors include aliphatic alcohols preferably having 1 to 12 carbon atoms such as methanol, ethanol, isopropanol, hexanol, octanol, 2-ethyl-hexanol and ethylene glycol; aromatic alcohols preferably having 7 to 15 carbon atoms such as benzyl alcohol; phenols preferably having 6 to 18 carbon atoms such as phenol, cresol and chlorophenol; aliphatic carboxylic acid esters preferably having 2 to 30 carbon atoms such as methyl formate, ethyl acetate, butyl acetate, vinyl acetate, methyl acrylate and ethyl laurate; aromatic carboxylic acid esters preferably having 8 to 30 carbon atoms such as methyl benzoate, ethyl benzoate, ethyl p-methylbenzoate and propyl p-hydroxybenzoate; aliphatic ethers preferably having 2 to 20 carbon atoms such as ethyl ether, butyl ether, allyl butyl ether, methyl undecyl ether and amyl ether; cyclic ethers preferably having 2 to 20 carbon atoms such as tetrahydrofuran and dioxane; aliphatic amines preferably having 1 to 18 carbon atoms such as methylamine, diethylamine, tributylamine and octylamine; aromatic amines preferably having 6 to 18 carbon atoms such as aniline and naphthylamine; aliphatic ketones having 3 to 15 carbon atoms such as acetone, methyl isobutyl ketone, ethyl butyl ketone and dihexyl ketone; aliphatic aldehydes containing 2 to 12 carbon atoms such as acetaldehyde and propionaldehyde; aliphatic carboxylic acids having 2 to 18 carbon atoms such as acetic acid, propionic acid, valeric acid and acrylic acid; aliphatic nitriles having 2 to 18 carbon atoms such as acetonitrile and acrylonitrile; aromatic nitriles having 7 to 20 carbon atoms such as benzonitrile and phthalonitrile; amides having 2 to 18 carbon atoms such as acetamide; and phosphines such as triethyl phosphine and triphenyl phosphine.

All known halogenating agents can be used. Examples of halogenating agents which are especially suitable for use in the present invention are elemental halogens such as $Cl_2$ and $Br_2$; hydrogen halides such as HCl, HBr and HI; halogenated methanes such as $CCl_3H$ and $CCl_4$; oxyhalogenides of non-metals such as $SO_2Cl_2$, $SOCl_2$, NOCl, $COCl_2$ and $POCl_3$; halogenides of non-metals such as $PCl_3$ and $PCl_5$; halogenides of metals such as $SiCl_4$, $SnCl_4$ and $AlCl_3$; and organohalogenides of metals such as $SiEtCl_3$, $SiOEtCl_3$ and $BuSnCl_3$.

Examples of the organometallic compounds are compounds of formula RM wherein R is an alkyl or aryl group, and M is lithium, sodium or potassium, compounds of formula $R_2M'$ wherein R is the same as defined above and M' is zinc or cadmium, compounds of formula $R_{2-l}MgX_l$ wherein R is the same as defined above, X is a halogen atom and l is zero or 1, compounds of formula $MAlR_4$ wherein R and M are the same as defined above, compounds of formula $R'_{3-m}AlX_m$ wherein R' is a hydrogen atom, or an alkyl or aryl group; X is the same as defined above, and m is zero or a positive number of less than 3, compounds of formula $R'_{3-n}Al(OR)_n$ wherein R' is the same as defined above, and n is a positive number greater than 0 but less than 3, and compounds of formula RAl(OR)X wherein R and X are the same as defined above.

If there are two or more R, R' and X in each of the above formula, they may be the same or different. Preferred alkyl groups represented by R or R' contain 1 to 12 carbon atoms, and preferred aryl groups represented by R or R' are phenyl and benzyl groups. X is preferably chlorine or bromine. Of the organometallic compounds exemplified above, organoaluminum compounds are especially preferred, especially those of the formula $R'_{3-m}AlX_m$. Among these, trialkyl aluminums such as triethyl aluminum and tributyl aluminum; dialkyl aluminum monohalides such as diethyl aluminum chloride and dibutyl aluminum bromide; alkyl aluminum sesquihalides such as ethyl aluminum sesquichloride; and mixtures of these are used especially preferably.

The amount of the electron donor, halogenating agent or organometallic compound can be selected as desired. For example, the amount of the electron donor is 0.001 to 10 moles, preferably 0.005 to 5 moles, per mole of the oxygen-containing, halogen-free compound of magnesium. The treating temperature in this case is −20° C. to 300° C., preferably 0° C. to 200° C.

The amount of the halogenating compound is 0.1 to 100 moles, preferably 0.2 to 50 moles, per mole is a oxygen-containing, halogen-free compond of magnesium. The treating temperature in this case may be 0° C. to 500° C. To retain the shape of the oxygen-containing, halogen-free compound of magnesium, mild treating conditions of 0° C. to 200° C. are preferred.

The amount of the organometallic compound is 0.0005 to 5 moles, preferably 0.001 to 3 moles, per mole of the oxygen-containing, halogen-free compound of magnesium. The treating temperature in this case is −30° C. to 200° C., preferably −10° C. to 100° C.

A catalyst component having a higher activity can be obtained by reacting the transition metal compound by any of the methods (i), (ii) and (iii) in the performance of the method (iv), then reacting the reaction product with about 0.1 to 6 moles, preferably 1 to 4 moles, of an electron donor per transition metal atom fixed to the carrier, then reacting the product with at least 0.1 mole, preferably 0.5 to 5 moles, of an organometallic compound per mole of the electron donor, optionally washing the product, and again reacting the product with a transition metal compound.

In pre-treating the oxygen-containing, halogen-free compound of magnesium with an electron donor, the electron donor may be contacted with the spray-dried magnesium compound, or the electron donor may be caused to be present in the suspension of the magnesium compound to be spray-dried.

A titanium or vanadium compound is preferred as the halogen-containing transition metal compound used to prepare the transition metal catalyst component (A). The titanium compound is most preferred. Suitable titanium compounds are halogen compounds of titanium which are liquid and solvent-soluble. Examples are those of the formula $$Ti(OR)_nX_{4-n}$$

wherein R represents an aliphatic, alicyclic or aromatic hydrocabon group, X represents a halogen atom such as Cl or Br, and $0 \leq n < 4$, preferably $0 \leq n \leq 2$, especially preferably n=0.

Examples of preferred hydrocabon groups R are alkyl groups with 1 to 10 carbon atoms and aryl groups with 6 to 12 carbon atoms. Specific examples of such titanium compounds are $TiCl_4$, $TiBr_4$, $Ti(OCH_3)Cl_3$, $Ti(OC_2H_5)_2Cl_2$, $Ti(O\ n-C_4H_9)_2Cl_2$ and $Ti(O\ n-C_8H_{17})Cl_3$.

Suitable vanadium compounds are those of the formula $$VO(OR)_mX_{3-m}\ \text{or}\ VX_4$$

wherein X and R are as defined above, and $0 \leq m < 3$, preferably $0 \leq m \leq 1.5$, especially preferably m=0. Specific examples are $VOCl_3$, $VOBr_3$, $VCl_4$ and $VO(OC_2H_5)Cl_2$.

The reaction of supporting the transition metal compound on the spherical particles of the oxygen-containing, halogen-free magnesium compound can be performed by dipping the particles of the oxyen-containing, halogen-free magnesium compound in a liquid transition metal compound or a dilution or solution of a transition metal compound in an inert solvent such as hexane, heptane or kerosene in an inert gas atmosphere free from oxygen and moisture. The reaction temperature used in this process is not particularly limited. Generally, the suitable reaction temperature is 50° to 200° C., and the suitable reaction time is about 10 minutes to about 20 hours. The amount of the transition metal compound is at least 0.5 atom, especially 2 to 50 atoms, as transition metal per magnesium atom in the magnesium compound.

Preferably, after the supporting reaction, the unreacted transition metal is removed as much as possible by filtration or decantation, and the product is washed well with an inert solvent such as hexane, heptane, octane or kerosene until no free transition metal component is detected.

A preferred example of the transition metal catalyst component (A) of the invention contains 3 to 120 mg, preferably 5 to 60 mg, of transition metal per gram thereof, and has a halogen/transition metal (atomic ratio) of preferably at least 5, more preferably 8 to 50, and especially preferably 10 to 50.

In the present invention, an olefin is polymerized by using a catalyst composed of the resulting transition metal component (A) comprising the spherical particles of an oxygen-containing, halogen-free magnesium compound obtained by a spray-drying technique and having a specific surface area of at least 20 m²/g and an average particle diameter of 5 to 300μ, and an organometallic compound (B)' of a metal of Groups I to III of the periodic table.

Examples of the organometallic compound of a metal of Groups I to III of the periodic table include the following.

(i) Organoaluminum compounds containing at least one Al-carbon bond in the molecule, for example organo-metallic compounds of the formula $$R^1{}_mAl(OR^2)_nH_pX_q$$

wherein $R^1$ and $R^2$ represent the same or different hydrocarbon groups containing 1 to 15 carbon atoms, preferably 1 to 4 carbon atoms, X represents a halogen, $0 < m \leq 3$, $0 \leq n < 3$, $0 \leq p < 3$, and $0 \leq q < 3$, and $m+n+p+q=3$. Examples of the hydrocarbon groups are methyl, ethyl, propyl, butyl, hexyl, octyl and phenyl groups.

(ii) Complex alkylated products of aluminum and metals of Group I of the periodic table which are expressed by the following formula $$M^1AlR^1{}_4$$

wherein $M^1$ represents Li, Na, or K, and $R^1$ is as defined above.

(iii) Dialkyl compounds of metals of Group II expressed by the general formula $$R^1R^2M^2$$

wherein $R^1$ and $R^2$ are as defined above, $M^2$ represents Mg, Zn or Cd.

Examples of the organoaluminum compounds of (i) are as follows:

$$R^1{}_mAl(OR^2)_{3-m}$$

wherein $R^1$ and $R^2$ are the same as defined above, and m is preferably $1.5 \leq m \leq 3$.

wherein $R^1$ is as defined above, X represents a halogen, and m is preferably $0<m<3$.

wherein $R^1$ is as defined hereinabove, and m is preferably $2\leq m<3$.

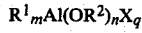

wherein $R^1$ and $R^2$ are as defined hereinabove, X represents a halogen, $0<m\leq 3$, $0\leq n<3$, $0\leq q<3$, and $m+n+q=3$.

Specific examples of the organoaluminum compounds (i) include trialkyl aluminums such as triethyl aluminum and tributyl aluminum; trialkenyl aluminums such as tri-isoprenyl aluminum; alkoxylated alkyl aluminums, for example, dialkyl aluminum alkoxides such as diethyl aluminum ethoxide and dibutyl aluminum butoxide, alkyl aluminum sesquialkoxides such as ethyl aluminum sesquiethoxide and butyl aluminum sesquibutoxide, and partially alkoxylated alkyl-aluminums such as compounds having an average composition of the formula $R^1{}_{2.5}Al(OR^2)_{0.5}$; halogenated alkyl aluminums, for example, dialkyl aluminum halides such as diethyl aluminum chloride, dibutyl aluminum chloride and diethyl aluminum bromide, alkyl aluminum sesquihalides such as ethyl aluminum sesquichloride, butyl aluminum sesquichloride and ethyl aluminum sesquibromide, and alkyl aluminum dihalides such as ethyl aluminum dichloride, propyl aluminum dichloride and butyl aluminum dibromide; partially halogenated alkyl aluminums such as compounds having an average composition of the formula $R^1{}_{2.5}AlX_{0.5}$; hydrogenated alkyl aluminums, for example, dialkyl aluminum hydrides such as diethyl aluminum hydride and dibutyl aluminum hydride, and alkyl aluminum dihydrides such as ethyl aluminum dihydride and propyl aluminum dihydride; partially hydrogenated alkyl aluminums such as compounds having an average composition of the formula $R^1{}_{2.5}AlH_{0.5}$; and alkoxylated and halogenated alkyl aluminums such as ethyl aluminum ethoxy chloride, butyl aluminum butoxy chloride and ethyl aluminum ethoxy bromide.

Examples of the compounds (ii) are $LiAl(C_2H_5)_4$ and $LiAl(C_7H_{15})_4$.

Examples of the compounds (iii) are diethyl zinc and diethyl magnesium. Alkyl magnesium halides such as ethyl magnesium chloride can also be used.

In the present invention, trialkyl aluminums, alkyl aluminum halides, alkyl aluminum hydrides, and mixtures of these are especially preferred.

Olefins used in the polymerization are, for example, ethylene, propylene, 1-butene, 4-methyl-1-pentene and 1-octene. These can be homopolymerized and also copolymerized (random-copolymerized, block-copolymerized). In copolymerizations, polyunsaturated compounds such as conjugated or non-conjugated dienes can be selected as comonomers. For example, when propylene is copolymerized, a method may be employed which comprises polymerizing propylene until a homopolymer of propylene is obtained in an amount corresponding to about 60 to 90% of the total composition, and subsequently, polymerizing a propylene/ethylene mixture or ethylene. Alternatively, a mixture of propylene and ethylene can be polymerized to obtain a copolymer containing ethylene in a proportion of less than about 5% by weight.

The polymerization can be performed either in the liquid or in the vapor phase. When the liquid-phase polymerization is carried out, an inert solvent such as hexane, heptane or kerosene may be used as a reaction medium. The olefin itself may also be used as a reaction medium. In the liquid-phase polymerization, it is preferred that the catalyst component (A) be used in an amount of 0.0001 to 1.0 millimole calculated as transition metal atom per liter of the liquid phase, and the metal atom in the component (B)' be in an amount of 1 to 1000 moles, preferably 5 to 500 moles, per mole of the transition metal in the component (A). In the vapor phase polymerization, a fluidized layer or a stirred fluidized layer is used, and the catalyst component (A) is added to the polymerization reactor as a solid or as diluted with hexane, olefin, etc. and the component (B)' with or without being diluted with hexane, olefin, etc. If desired, hydrogen gas may be fed into the polymerization reactor. The amount of the catalyst is the same as in the case of the liquid-phase polymerization.

The temperature for polymerizing the olefin is generally 20° to 200° C., preferably 20° to below the melting point of the resulting olefin polymer, especially preferably 40° to 120° C. The polymerization is carried out generally at atmospheric pressure to 100 kg/cm²·G. Preferably, it is carried out under elevated pressures of about 2 to 50 kg/cm²·G.

The molecular weight of the α-olefin polymer to be produced with the aid of the catalyst of this invention can be adjusted by varying the polymerization conditions such as the polymerization temperature, and the molar proportion of the catalyst. However, addition of hydrogen to the polymerization system is effective to control the molecular weight of the α-olefin polymer. In the polymerization of an α-olefin having at least 3 carbon atoms, an electron donor such as alcohols, ethers, esters, amines, acid anhydrides, ketones, carboxylic acids, amides, phosphorus compounds and polysiloxanes may be used together to control the stereoregularity of the polymer. The electron donor may be used in the form of an adduct with the component (B)'.

In addition to the various advantages described above, the use of the catalyst system of the invention also offers the advantage that when ethylene is polymerized with this catalyst system, polyethylene in spherical form having a high bulk density and a narrow particle size distribution can be obtained with a very small amount of the transition metal for the amount of polyethylene formed, and the after-treatment of the resulting polymer is very much simplified or is not required at all. Accordingly, in a vapor phase polymerization procedure which does not require a solvent, a great improvement is made on problems associated with the polymerization process, such as the securing of a uniform fluidized state, process restrictions caused by the formation of a fine powdery polymer, and on the transportation of a polymer powder within the polymerization process, and a polymer which can be directly offered as a final product can be obtained by polymerization in the absence of solvent.

The following examples illustrate the present invention in greater detail.

EXAMPLE 1

Preparation of spherical $Mg(OH)_2$:

Two kilograms of commercially available magnesium hydroxide (having a particle diameter smaller than 100 mesh) having a specific surface area of 67 m$^2$/g was suspended in 11 liters of water, and the suspension was subjected to pulverization treatment for 1 hour by a 20 liter homomixer equipped with a turbine stator while stirring at a speed of 5000 rpm. After this treatment, the particle diameter of magnesium hydroxide was examined by an optical microscope and an electron microscope. All of the magnesium hydroxide particles had a particle diameter within the range of 0.04 to 3μ. The aqueous slurry of magnesium hydroxide was heated to 80° C. with stirring, and sprayed into a concurrently flowing hot air at 150° C. by using a spray dryer having pneumatic atomizing nozzles with a nozzle diameter of 0.254 mm. Pressurization was obtained by using nitrogen.

The resulting spherical particles were withdrawn from the bottom of the dryer, and then screened to obtain particles with a size of 20μ to 63μ. The yield of magnesium hydroxide particles having a particle size of 20μ to 63μ was 87% based on the total amount of the magnesium hydroxide sprayed. The resulting magnesium hydroxide still contained 1.2% by weight of water used as solvent, as was in the form of spherical particles having a specific surface area of 85 m$^2$/g. By an X-ray diffraction analysis and a composition analysis, the resulting spherical particles were determined to be Mg(OH)$_2$.

Synthesis of Ti catalyst component:

A 500 ml flask well purged with nitrogen was charged with 300 ml of titanium tetrachloride and 20 g of the magnesium hydroxide obtained by the aforesaid procedure, and they were reacted at 135° C. for 2 hours. After the reaction, the solution portion was removed by decantation, and the residue was repeatedly washed with hexane until there was scarcely any free titanium. The resulting solid was found to have 21 mg of Ti atom and 225 mg of chlorine supported per gram of solid.

Polymerization:

One liter of hexane as a solvent was introduced into a 2-liter autoclave. The inside of the autoclave was sufficiently purged with nitrogen, and 1.5 millimoles of triethyl aluminum, and 0.03 millimole, calculated as Ti atom, of the solid catalyst prepared as described above were added, and the inside of the autoclave was heated to 80° C. Then, 4 kg/cm$^2$ of hydrogen and 4 kg/cm$^2$ of ethylene were introduced, and ethylene was continuously added so that the total pressure became 8 kg/cm$^2$. In this way, ethylene was polymerized for 2 hours. The solvent was separated from the reaction mixture, and the residue was directly dried. There was obtained 312 g of polyethylene in spherical form having a melt index of 1.2, a bulk density of 0.41 g/cm$^3$ and a very narrow particle size distribution. The yield of polyethylene was 10,400 g per millimole of titanium and 4,560 g per gram of the catalyst. The polymer contained 4.5 ppm of titanium and only 52 ppm of chlorine.

COMPARATIVE EXAMPLE 1

The same commercially available magnesium hydroxide as used in Example 1 was screened to a size of 37 to 74μ, and dried in a stream of nitrogen at 150° C. for 1 hour. Twenty grams of the magnesium hydroxide was reacted with 300 ml of titanium tetrachloride at 135° C. for 2 hours in the same way as in Example 1. The solution portion was removed by decantation, and the residue was repeatedly washed with hexane to form a catalyst. The resulting solid catalyst was analyzed for its composition, and found to contain 11 mg of Ti atom and 155 mg of Cl per gram of solid.

Ethylene was polymerized using the resulting catalyst in the same way as in Example 1. There was obtained 246 g of irregularly-shaped polyethylene having a melt index of 0.54 and a bulk density of 0.21 g/cm$^3$. The yield of polyethylene was 8,200 g per millimole of titanium, and 1,880 g per gram of the catalyst. The polymer contained 6.0 ppm of titanium and 12.5 ppm of chlorine.

COMPARATIVE EXAMPLE 2

The same commercially available magnesium hydroxide as used in Example 1 was sieved to a size of 37 to 74μ, and dried in a stream of nitrogen at 150° C. for 1 hour. Twenty gram of the magnesium hydroxide was reacted with 100 ml of titanium tetrachloride at 135° C. for 2 hours. After the reaction, the solution portion was removed by decantation, and the residue was repeatedly washed with hexane. The solid catalyst obtained was analyzed for its composition, and found to have 20 mg of Ti atom and 152 mg of Cl supported per gram of the solid.

Ethylene was polymerized by using the resulting catalyst in the same way as in Example 1 to afford 105 g of amorphous polyethylene having a melt index of 1.44 and a bulk density of 0.18 g/cm$^3$. The yield of polyethylene was 3,500 g per millimole of titanium, and 1,460 g per gram of the catalyst. The polymer contained 14 ppm of titanium and 133 ppm of chlorine.

EXAMPLE 2

The same commercially available magnesium hydroxide (with a particles diameter smaller than 100 mesh) having a specific surface area of 67 m$^2$/g (2 kg) was suspended in 11 liters of water. The suspension was subjected to pulverization treatment for 1 hour by a 20 liter homomixer equipped with a turbine stator while stirring at a speed of 5000 rpm. The resulting laqueous slurry of magnesium hydroxide was sprayed against a concurrently flowing hot air at 250° C. by using a spray dryer having pneumatic atomizing nozzles with a nozzle diameter of 0.254 mm. Pressurization was obtained by nitrogen. The spherical particles were withdrawn from the bottom of the dryer, and then sieved to obtain particles with a diameter of 20μ to 63μ. The yield of magnesium hydroxide having a particle diameter of 20 to 63μ obtained by this sieving operation was 83% based on the total weight of the magnesium hydroxide sprayed. The resulting magnesium hydroxide still had a water content of 0.6% by weight, and a specific surface area of 91 m$^2$/g. By an X-ray diffraction analysis and composition analysis, the resulting spherical particles were determined to be Mg(OH)$_2$.

In the same way as in Example 1, the resulting magnesium hydroxide was reacted with titanium tetrachloride, to form a solid catalyst. The resulting solid was analyzed for its composition, and found to have 17 mg of Ti atom and 240 mg of chlorine supported per gram of the solid.

Ethylene was polymerized under the same conditions as in Example 1 using the resulting catalyst. There was obtained 291 g of spherical polyethylene having a melt index of 0.95, a bulk density of 0.40 g/cm$^3$, and a very narrow particle diameter distribution. The yield of polyethylene was 9,700 g per millimole of titanium, and 3,440 g per gram of catalyst. The polymer contained 5 ppm of titanium and 72 ppm of chlorine.

EXAMPLE 3

Two kilograms of the same commercially available magnesium hydroxide (with a particle size smaller than 100 mesh) having a specific surface area of 67 m²/g was suspended in 10 liters of water, and 2 kg of a colloidal aqueous solution of aluminum hydroxide (with an aluminum hydroxide concentration of 10.0% by weight) was added to the suspension. The mixture was subjected to pulverization treatment for 1 hour by a 20 liter homomixer equipped with a turbine stator while stirring at a rotating speed of 5,000 rpm. After the treatment, the particle diameter of the magnesium hydroxide containing aluminum hydroxide was examined by an optical microscope and an electron microscope. All the particles were found to have a particle size within the range of $0.06\mu$ to $4\mu$. The aqueous slurry of the magnesium hydroxide containing aluminum hydroxide was heated to 80° C., and sprayed against a concurrently flowing hot air at 200° C. by using a spray dryer equipped with pneumatic atomizing nozzles with a nozzle diameter of 0.254 mm.

The spherical particles were withdrawn from the bottom of the dryer, and sieved to a size of $20\mu$ to $63\mu$. The amount of the particles of magnesium hydroxide containing aluminum hydroxide having a particle diameter of $20\mu$ to $63\mu$ was 81% of the total amount of the magnesium hydroxide sprayed. The resulting solid was in the form of spherical particles still containing 0.7% by weight of water used as a solvent, and having a specific surface area of 98 m²/g. An X-ray diffraction pattern of the product did not show a diffraction line of $Al(OH)_3$ and a diffraction line of $Al_2O_3$, and showed only a diffraction line of $Mg(OH)_2$ which had a large half value width. The resulting carrier was reacted with titanium tetrachloride under the same conditions as in Example 1. The resulting solid catalyst was analyzed for its composition, and found to have 22 mg of Ti atom and 255 mg of chlorine supported per gram of the solid.

Ethylene was polymerized under the same conditions as in Example 1 using the resulting catalyst. There was obtained 282 g of spherical polyethylene having a melt index of 1.5, a bulk density of 0.40 g/cm³ and a very narrow particle size distribution. The yield of polyethylene was 9400 g per millimole of titanium, and 4,320 g per gram of the catalyst. The polymer contained 5.0 ppm of titanium and 59 ppm of chlorine.

EXAMPLE 4

Two kilograms of the same commercially available magnesium hydroxide (with a particle diameter smaller than 100 mesh) having a specific surface area of 67 m²/g as used in Example 1 was suspended in 10 liters of water, and 1 kg of an aqueous colloidal silica solution (concentration as $SiO_2$ 20% by weight) was added to the suspension. The mixture was treated for 1 hour by a 20-liter homomixer equipped with a turbine stator while stirring at a rotating speed of 5,000 rpm. After the treatment, the magnesium hydroxide containing silica was examined by an optical microscope and an electron microscope. It was found that all the particles of the magnesium hydroxide obtained had a particle diameter within the range of $0.08\mu$ to $5\mu$. The aqueous slurry of the magnesium hydroxide containing silica was heated to 80° C. with stirring, and sprayed against a concurrently flowing hot air at 200° C. by using a spray dryer equipped with pneumatic atomizing nozzles with a nozzle diameter of 0.254 mm. Pressurization was obtained by nitrogen.

To obtain particles with a particle diameter of 20 to $63\mu$, the resulting product was sieved. The yield of magnesium hydroxide containing silica having a particle diameter of $20\mu$ to $63\mu$ obtained by this sieving operation was 79% based on the total amount of the magnesium hydroxide sprayed. The resulting catalyst was in the form of spherical particles still containing 0.9% by weight of water used as solvent and having a specific surface area of 89 m²/g.

The resulting carrier was reacted with titanium tetrachloride under the same conditions as in Example 1. The solid obtained was analyzed for its composition, and found to contain 19 mg of Ti atom and 250 mg of chlorine per gram of the solid.

Ethylene was polymerized under the same conditions as in Example 1 by using the catalyst obtained by the above procedure. There was obtained 298 g of spherical polyethylene having a melt index of 1.6, a bulk density of 0.44 g/cm³ and a very narrow particle size distribution. The yield of polyethylene was 9,930 g per millimole of titanium, and 3,940 g per gram of the catalyst. The polymer contained 4.5 ppm of titanium and 60 ppm of chlorine.

EXAMPLE 5

Two kilograms of commercially available magnesium oxide having a specific surface area of 27 m²/g was suspended in 12 liters of water. The suspension was treated for 1 hour by a 20-liter homomixer equipped with a turbine stator while stirring at a rotating speed of 5,000 rpm. After the treatment, the particle diameter of magnesium oxide was examined by an optical microscope and an electron microscope. It was found that all the particles of the magnesium oxide had a particle diameter within the range of $0.09\mu$ to $3\mu$. The aqueous slurry of the magnesium oxide was sprayed against a concurrently flowing hot air at 280° C. by using a spray dryer equipped with pneumatic atomizing nozzles with a nozzle diameter of 0.254 mm. Pressurization was obtained by nitrogen.

The spherical particles were withdrawn from the bottom of the dryer, and then sieved to a particle diameter of $37\mu$ to $74\mu$. The yield of the magnesium oxide particles having a size of 37 to $74\mu$ obtained by this sieving operation was 68% based on the total amount of the magnesium oxide sprayed. The resulting magnesium oxide was in the form of spherical particles still containing 0.6% by weight of water used as a solvent and having a specific surface area of 41 m²/g. An X-ray diffraction pattern of the resulting carrier showed a diffraction line of MgO and diffraction line partly showing $Mg(OH)_2$.

The resulting carrier was reacted with titanium tetrachloride under the same conditions as in Example 1. The solid obtained was analyzed for its composition, and found to have 14 mg of Ti atom and 205 mg of chlorine supported per gram of the solid.

Ethylene was polymerized under the same conditions as in Example 1 by using the catalyst prepared by the above method. There was obtained 252 g of spherical polyethylene having a melt index of 1.3, a bulk density of 0.42 g/cm³ and a very narrow particle size distribution. The yield of polyethylene was 8,400 g per millimole of titanium, and 2,460 g per gram of catalyst. The polymer contained 6.0 ppm of titanium and 88 ppm of chlorine.

COMPARATIVE EXAMPLE 3

The same commercially available magnesium oxide having a specific surface area of 27 m²/g as used in Example 5 was sieved to a particle diameter of 37μ to 74μ, and dried in a stream of nitrogen at 150° C. for 1 hour. Twenty grams of the magnesium oxide was reacted with 300 ml of titanium tetrachloride at 135° C. for 2 hours. The solution portion was removed by decantation, and the residue was repeatedly washed with hexane. The resulting solid catalyst was analyzed for its composition, and found to have 8 mg of Ti atom and 92 mg of Cl supported per gram of the solid.

Ethylene was polymerized under the same conditions as in Example 1 using the catalyst prepared as above. There was obtained 240 g of irregularly-shaped polyethylene having a melt index of 0.54, a bulk density of 0.20 g/cm³, and a broad particle size distribution. The yield of the polymer was 8,000 g per millimole of titanium, and 1,340 g per gram of the catalyst. The polymer contained 6 ppm of titanium and 75 ppm of chlorine.

The data in the foregoing examples are shown in Table 1 below.

the procedure of Example 1, and the mixture was stirred at 25° to 30° C. for 30 minutes. Then, diethyl aluminum chloride was added dropwise at 25° to 30° C. in an amount one-half of the moles of ethanol, and after the addition, the mixture was stirred at 25° to 30° C. for 1 hour. Then, the kerosene as solvent was removed by decantation. The residue was washed two times with 150 ml of kerosene, and 150 ml of titanium tetrachloride was added and reacted at 130° C. for 2 hours. The product was repeatedly washed with hexane until there was scarcely any free titanium. The resulting solid was analyzed for its composition, and found to have 21 mg of Ti atom and 276 mg of chlorine supported per gram of the solid.

The same autoclave as used in Example 1 was charged with 1 liter of hexane as a solvent, 1.0 millimole of triethyl aluminum and 0.02 millimole, calculated as Ti atom in the catalyst, of the resulting catalyst, and the temperature of the mixture in the autoclave was elevated to 80° C. Then, hydrogen (4 kg/cm²) and ethylene (4 kg/cm²) were introduced, and ethylene was continuously added so that the total pressure of the reaction system became 8 kg/cm². Thus, ethylene was polymerized for 2 hours to afford 365 g of spherical polyethylene having a melt index of 8.3, a bulk density of 0.43

TABLE 1

| Example (Ex.) of Comparative Example (CEx.) | Specific surface area of the starting Mg compound (m²/g) | Average particle diameter of the Mg compound (μ) | Specific surface area of the Mg compound after pelletization (m²/g) | Amount of Ti fixed (mg/g of solid) | Catalyst activity (g-PE/mmol Ti) | Catalyst activity (g-PE/g-solid) |
|---|---|---|---|---|---|---|
| Ex. 1 | 67 | 41 | 85 | 21 | 10400 | 4560 |
| CEx. 1 | 67 | " | — | 11 | 8200 | 1880 |
| CEx. 2 | 67 | " | — | 20 | 3500 | 1460 |
| Ex. 2 | 67 | " | 91 | 17 | 9700 | 3440 |
| Ex. 3 | 67 | " | 98 | 22 | 9400 | 4320 |
| Ex. 4 | 67 | " | 89 | 19 | 9930 | 3940 |
| Ex. 5 | 27 | 43 | 41 | 14 | 8400 | 2460 |
| CEx. 3 | 27 | " | — | 8 | 8000 | 1340 |

| Example (Ex.) of Comparative Example (CEx.) | Bulk density of PE (g/cm³) | Particle size distribution of PE (wt. %) | | | | | | Shape of PE |
|---|---|---|---|---|---|---|---|---|
| | | 10 mesh on | 10–20 mesh | 20–40 mesh | 40–100 mesh | 100–200 mesh | 200 mesh under | |
| Ex. 1 | 0.41 | 0.2 | 10.2 | 89.4 | 0.2 | 0 | 0 | Spherical |
| CEx. 1 | 0.21 | 1.1 | 6.1 | 15.6 | 23.4 | 32.8 | 21.0 | Irregular shape |
| CEx. 2 | 0.18 | 2.0 | 3.5 | 10.3 | 18.5 | 39.1 | 26.6 | Irregular shape |
| Ex. 2 | 0.40 | 0 | 6.2 | 93.6 | 0.2 | 0 | 0 | Spherical |
| Ex. 3 | 0.40 | 0.2 | 14.6 | 84.8 | 0.4 | 0 | 0 | Spherical |
| Ex. 4 | 0.44 | 0.3 | 12.2 | 85.5 | 1.8 | 0.2 | 0 | Spherical |
| Ex. 5 | 0.42 | 1.2 | 60.3 | 38.3 | 0.2 | 0 | 0 | Spherical |
| CEx. 3 | 0.20 | 3.5 | 2.3 | 16.8 | 20.1 | 28.0 | 29.3 | Irregular shape |

*PE = Polyethylene

EXAMPLE 6

The catalyst having a magnesium hydroxide carrier obtained in Example 1 was treated with an electron donor, an organoaluminum compound and titanium tetrachloride in the following manner.

Thirty grams of the catalyst obtained by the procedure of Example 1 was charged into a three-necked flask sufficiently purged with nitrogen, and 150 ml of kerosene was added. At a reaction temperature of 25° to 30° C., ethanol was added dropwise in an amount 4 molar times (30 g×21 mg÷47.9×4=52.6 millimoles) the amount of Ti supported in the catalyst obtained by g/cm³, and a very narrow particle size distribution. The yield of polyethylene was 18,250 g per millimole of titanium, and 8,000 g per gram of catalyst. The polymer contained 2.5 ppm of titanium and 34 ppm of chlorine.

EXAMPLE 7

A catalyst was synthesized in the same way as in Example 6 except that the amount of ethanol used as an electron donor was changed to two molar times the amount of Ti. The solid catalyst obtained was analyzed for its composition, and found to have 21 mg of Ti atom and 262 mg of chlorine supported per gram of the solid.

Ethylene was polymerized under the same conditions as in Example 6 using the resulting catalyst to afford 332 g of spherical polyethylene having a melt index of 6.5, a bulk density of 42 g/cm$^3$, and a very narrow particle size distribution. The yield of polyethylene was 16,600 g per millimole of titanium, and 7,280 g per gram of the catalyst. The polymer contained 3.0 ppm of titanium and 36 ppm of chlorine.

EXAMPLE 8

A catalyst was synthesized in the same way as in Example 6 except that the amount of ethanol used as an electron donor was changed to 6 molar times the amount of Ti. The resulting solid catalyst was analyzed for its composition, and found to have 20 mg of Ti atom and 258 mg of chlorine supported per gram of the solid.

Ethylene was polymerized under the same conditions as in Example 6 using the resulting catalyst to afford 298 g of spherical polyethylene having a melt index of 5.8, a bulk density of 0.42 g/cm$^3$, and a very narrow particle size distribution. The yield of polyethylene was 14,900 g per millimole of titanium, and 6,220 g per gram of the catalyst. The polymer contained 3.3 ppm of titanium and 43 ppm of chlorine.

EXAMPLE 9

A catalyst was synthesized in the same way as in Example 6 except that the amount of diethyl aluminum chloride was the same in mole as ethanol. The resulting solid catalyst was analyzed for its composition, and found to have 23 mg of Ti atom and 280 mg of chlorine supported per gram of the solid.

Ethylene was polymerized under the same conditions as in Example 6 using the resulting catalyst to afford 342 g of spherical polyethylene having a melt index of 6.3, a bulk density of 0.41 g/cm$^3$, and a very narrow particle size distribution. The yield of polyethylene was 17,100 g per millimole of titanium, and 8,210 g per gram of the catalyst. The polymer contained 2.5 ppm of titanium and 30 ppm of chlorine.

EXAMPLES 10 to 14

The procedure of Example 6 was repeated except that each of isopropyl alcohol, cresol, ethyl benzoate, ethyl acetate and butyl ether was used instead of the ethanol. The results of analysis of the resulting solids and of polymerizing ethylene under the same conditions as in Example 6 are shown in Table 2.

EXAMPLE 15

A 2-liter autoclave was charged with 1 liter of hexane as a solvent, 2.4 millimoles of triethyl aluminum, and 0.8 millimole of ethyl p-methylbenzoate, and 0.03 millimole, calculated as Ti atom, of the catalyst obtained in Example 12 was added. The temperature of the autoclave was elevated to 60° C. Then, hydrogen (0.5 kg/cm$^2$) was added, and propylene was polymerized for 4 hours while adding it continuously so that the total pressure of the reaction system became 7 kg/cm$^2$. There was obtained 247 g of spherical polypropylene having a melt index of 6.3, a bulk density of 0.44 g/cm$^3$, and a very narrow particle size distribution. The resulting propylene polymer had a boiling n-heptane extraction residue of 90.2%. Concentrating the solution portion of the product gave 13.5 g of a solvent-soluble polymer.

The data of Examples 6 to 14 are tabulated below.

TABLE 2

| Example | Mole ratio of Ti/electron donor/Et$_2$AlCl in catalyst treatment | Type of electron donor | Amount of Ti fixed (mg/g of solid) | Amount of Cl fixed (mg/g of solid) | Catalyst activity g-PE/mM of Ti | Catalyst activity g-PE/g of solid |
|---|---|---|---|---|---|---|
| 6 | 1/4/2 | Ethanol | 21 | 276 | 18250 | 8000 |
| 7 | 1/2/1 | Ethanol | 21 | 262 | 16600 | 7280 |
| 8 | 1/6/3 | Ethanol | 20 | 258 | 14900 | 6220 |
| 9 | 1/4/2 | Ethanol | 23 | 280 | 17100 | 8210 |
| 10 | 1/4/2 | Isopropyl alcohol | 21 | 270 | 16300 | 7150 |
| 11 | 1/4/2 | Cresol | 22 | 277 | 19800 | 9090 |
| 12 | 1/4/2 | Ethyl benzoate | 21 | 265 | 19200 | 8420 |
| 13 | 1/4/2 | Ethyl acetate | 21 | 249 | 14400 | 6310 |
| 14 | 1/4/2 | Butyl ether | 21 | 235 | 11100 | 4870 |

| Example | Bulk density (g/cm$^3$) | Melt index | Particle size distribution of polyethylene (wt. %) 10 mesh on | 10-20 mesh | 20-40 mesh | 40-100 mesh | 100-200 mesh | 200 mesh under | Shape of PE |
|---|---|---|---|---|---|---|---|---|---|
| 6 | 0.43 | 8.3 | 3.5 | 58.4 | 36.7 | 1.2 | 0.2 | 0 | Spherical |
| 7 | 0.42 | 6.5 | 1.9 | 25.2 | 72.2 | 0.7 | 0 | 0 | " |
| 8 | 0.42 | 5.8 | 1.8 | 34.9 | 62.5 | 0.8 | 0 | 0 | " |
| 9 | 0.41 | 6.3 | 2.1 | 56.1 | 40.1 | 1.1 | 0.6 | 0 | " |
| 10 | 0.42 | 4.4 | 1.5 | 53.6 | 43.9 | 0.9 | 0.1 | 0 | " |
| 11 | 0.44 | 5.9 | 4.3 | 64.4 | 28.6 | 2.0 | 0.7 | 0 | " |
| 12 | 0.44 | 7.1 | 3.8 | 63.0 | 31.3 | 1.2 | 0.7 | 0 | " |
| 13 | 0.40 | 3.2 | 0.8 | 24.6 | 74.2 | 0.4 | 0 | 0 | " |
| 14 | 0.40 | 2.5 | 0.6 | 18.1 | 80.8 | 0.5 | 0 | 0 | " |

*PE = Polyethylene

EXAMPLE 16

Two kilograms of the same commercially available magnesium hydroxide having a specific surface area of 67 m$^2$/g (particle diameter smaller than 100 mesh) as used in Example 1 and 1 kg of magnesium carbonate trihydrate were suspended in 15 liters of water. The suspension was subjected to treatment for 3 hours by using a 20-liter homomixer equipped with a turbine stator at a stirring speed of 5,000 rpm. The resulting aqueous slurry of the magnesium compound was directly sprayed against a concurrently flowing hot air at 280° C. by using a spray dryer equipped with pneumatic atomizing nozzles with a nozzle diameter of 0.254 mm. The spherical particles were withdrawn from the bottom of the dryer, and then sieved to obtain particles having a particle diameter of 20 to 63μ. The yield of the magnesium compound having a particle diameter of 20 to 63μ obtained by this sieving operation was 77% of the total amount of the magnesium hydroxide sprayed. The resulting magnesium compound contained 0.7% by weight of water, and had a specific surface area of 80 m²/g.

Twenty grams of the resulting magnesium compound was reacted with 500 ml of titanium tetrachloride to form a catalyst. The composition analysis of the resulting solid showed that it contained 37 mg of Ti atom and 330 mg of chlorine supported per gram of the solid.

Ethylene was polymerized under the same conditions as in Example 1 by using this catalyst to obtain 248 g of spherical polyethylene having a melt index of 2.0, a bulk density of 0.39 g/cm³ and a very narrow particle size distribution. The yield of polyethylene was 8,300 g per millimole of titanium, and 6,410 g per gram of the catalyst. The polymer contained 6 ppm of titanium and 52 ppm of chlorine.

What we claim is:

1. A process for producing spherical polyethylene particles of high bulk density and a narrow particle size distribution comprising polymerizing ethylene in the presence of a catalyst comprising
   (A) a halogen-containing titanium compound expressed by the formula $Ti(OR)_nX_{4-n}$ wherein R represents a member selected from the group consisting of alkyl groups with 1 to 10 carbon atoms and aryl groups with 6 to 12 carbon atoms, X represents a halogen atom, and $0 \leq n < 4$, supported on spray-dried solid spherical carrier particles of magnesium hydroxide or magnesium oxide having a specific surface area of at least 20 m²/g and an average particle diameter of 5 to 300μ, said component (A) having an atomic ratio of halogen atom/titanium atom of from 5/1 to 50/1, and
   (B) 1 to 1000 moles, as aluminum atom, of an organoaluminum compound per mole of the titanium atom in component (A).

2. The process of claim 1 wherein the catalyst further comprises an electron donor compound.

3. The process of claim 1 wherein the spherical carrier particles have an average particle diameter from 10 to 200μ a specific surface area of 20 to 500 m²/g.

4. The process of claim 3 wherein the amount of the titanium compound is sufficient to provide from 2 to 50 atoms of Ti per atom of Mg and from 3 to 120 mg of titanium per gram of component (A) and the atomic ratio of halogen atom/titanium atom in component (A) is from 10/1 to 50/1.

5. The process of claim 4 wherein the titanium compound is titanium tetrachloride.

6. The process of claim 5 wherein the organoaluminum compound is triethyl aluminum.

7. The process of claim 6 wherein the polymerization is carried out at a temperature in the range of from about 40° C. to about 120° C. and at an elevated pressure of from about 2 to 50 Kg/cm².G.

8. A process for producing spherical polymer particles of ethylene or copolymer particles of ethylene with a comonomer selected from the group consisting of propylene, 1-butene, 4-methyl-1-pentene, 1-octene and dienes, said particles having a high bulk density and a narrow particle size distribution, which comprises polymerizing ethylene or copolymerizing ethylene with said comonomer in the presence of a catalyst composed of
   (A) a halogen-containing titanium catalyst component prepared by supporting a titanium compound expressed by the formula $Ti(OR)_nX_{4-n}$ wherein R represents a member selected from the group consisting of alkyl groups with 1 to 10 carbon atoms and aryl groups with 6 to 12 carbon atoms, X represents a halogen atom, and $0 \leq n < 4$, on solid spherical particles of magnesium hydroxide or magnesium oxide having a specific surface area of at least 20 m²/g and an average particle diameter of 5 to 300μ obtained by spray-drying a suspension of the magnesium compound having an average particle diameter of 0.01 to 20μ, and
   (B) 1 to 1000 moles, as aluminum atom, of an organoaluminum compound per mole of the titanium atom in component (A).

9. The process of claim 8 wherein the α-olefin is ethylene.

10. The process of claim 7 wherein said spray-dried solid spherical particles are particles of magnesium hydroxide having a particle size of about 20μ to 63μ and a specific surface area of about 85 m²/g; said catalyst component (A) comprises about 21 mg of titanium atom and about 225 mg of chlorine per gram; and said polymerization reaction is carried out in the presence of said catalyst at an (A)/(B) molar ratio of about 0.03/1.5, wherein the amount of (A) is calculated as atoms of titanium, and at a temperature of about 80° C. under a total pressure of about 8 Kg/cm².

* * * * *